United States Patent [19]
Nakagawa et al.

[11] Patent Number: 5,337,240
[45] Date of Patent: Aug. 9, 1994

[54] MISFIRING SENSING APPARATUS

[75] Inventors: Akihiro Nakagawa; Akira Demizu, both of Himeji; Ryoji Nishiyama, Amagasaki, all of Japan

[73] Assignee: Mitsubishi Denki Kabushiki Kaisha, Tokyo, Japan

[21] Appl. No.: 761,531

[22] Filed: Sep. 18, 1991

[30] Foreign Application Priority Data

Sep. 20, 1990 [JP] Japan .................. 2-252566
Dec. 26, 1990 [JP] Japan .................. 2-414000

[51] Int. Cl.⁵ ............................ G01M 15/00
[52] U.S. Cl. ................ 364/431.01; 364/431.05; 364/431.07; 73/117.3
[58] Field of Search ........... 354/431.01; 73/115, 73/116, 117; 123/425; 364/431.07, 431.08, 424.1

[56] References Cited

U.S. PATENT DOCUMENTS

| | | | |
|---|---|---|---|
| 4,179,922 | 12/1979 | Bouverie et al. | 73/116 |
| 4,295,363 | 10/1981 | Buck et al. | 73/117.3 |
| 4,951,628 | 8/1990 | Matsuoka et al. | 123/414 |
| 5,041,980 | 8/1991 | Maddock et al. | 364/431.03 |
| 5,044,195 | 9/1991 | James et al. | 73/117.3 |
| 5,056,360 | 10/1991 | Dosdall et al. | 73/116 |
| 5,076,098 | 12/1991 | Miwa | 73/115 |
| 5,105,657 | 4/1992 | Nakaniwa | 73/117.3 |
| 5,109,695 | 5/1992 | James et al. | 73/117.3 |
| 5,111,405 | 5/1992 | Maeda et al. | 364/431.07 |
| 5,168,854 | 12/1992 | Hashimoto et al. | 123/425 |

FOREIGN PATENT DOCUMENTS

| | | |
|---|---|---|
| 3615547 | 11/1986 | Fed. Rep. of Germany . |
| 3724420 | 2/1989 | Fed. Rep. of Germany . |
| 3927699 | 3/1990 | Fed. Rep. of Germany . |
| 4028131 | 3/1992 | Fed. Rep. of Germany . |

*Primary Examiner*—Thomas G. Black
*Assistant Examiner*—Tan Q. Nguyen
*Attorney, Agent, or Firm*—Sughrue, Mion, Zinn, Macpeak & Seas

[57] ABSTRACT

A misfiring sensing apparatus for an internal combustion engine measures the length of time required for two periods during the operation of an engine, each of the periods corresponding to a predetermined number of degrees of rotation of the crankshaft of the engine and corresponding to prescribed positions of the pistons of the engine. The two periods are selected so that the ratio of the lengths of the two periods will change when one of the cylinders of the engine is misfiring. Misfiring is detected based on the value of the ratio. In one form of the invention, misfiring is sensed by comparing the ratio with a reference value. In another form of the invention, the ratio is used to calculate a value indicative of the current angular acceleration of the crankshaft of the engine, and the calculated value is compared with a reference value to determine whether knocking is taking place.

23 Claims, 13 Drawing Sheets

45° BTDC ROUTINE

TDC ROUTINE (76° BTDC ROUTINE)

(6° BTDC ROUTINE)

MISFIRING SENSING APPARATUS

BACKGROUND OF THE INVENTION

This invention relates to a misfiring sensing apparatus for an internal combustion engine, and in particular to a misfiring sensing apparatus for an engine of an automobile.

Misfiring is a phenomenon which occurs in an internal combustion engine when one of the cylinders in the engine fails to ignite. Misfiring can be due to a number of causes, such as the failure of the ignition system to generate an adequate spark in a cylinder or a failure of the fuel supply system to supply a proper fuel-air mixture to a cylinder. When misfiring is due to a failure of the ignition system, uncombusted fuel is discharged from a misfiring cylinder. The discharge of uncombusted fuel from an engine is undesirable, because the uncombusted fuel can damage a catalytic converter for the engine. Therefore, it is desirable to be able to detect misfiring in an engine and then cut off the supply of fuel to a misfiring cylinder.

For this reason, various misfiring sensing devices have been proposed. One conventional type of misfiring sensing device is disclosed in Japanese Published Unexamined Patent Application No. 62-26345. In that device, the pressure within each cylinder of an engine is sensed by a pressure sensor, and the crankshaft angle at which a maximum pressure occurs in each cylinder is determined. The engine is considered to be operating normally when the maximum pressure for each cylinder falls within a prescribed period defined by two crankshaft angles.

However, that conventional device has a number of problems. For example, it is necessary to continuously monitor the cylinder pressure, so the apparatus tends to be complicated. Furthermore, when the engine is operating under a light load, the pressure within each cylinder has two peaks, one occurring at top dead center during the compression stroke and the other occurring during the combustion stroke, and it is difficult to differentiate the two peaks. Furthermore, when a pressure peak occurs prior to top dead center during the compression stroke of a cylinder, it is not possible to detect misfiring.

SUMMARY OF THE INVENTION

Accordingly, it is an object of the present invention to provide a misfiring sensing apparatus for an internal combustion engine which can accurately sense knocking over the entire operating range of an engine.

It is another object of the present invention to provide a misfiring sensing apparatus that has a relatively simple structure.

It is still another object of the present invention to provide a misfiring sensing apparatus that can be readily applied to existing engines.

A misfiring sensing apparatus according to the present invention measures the length of time required for two periods during the operation of an engine, each of the periods corresponding to a predetermined number of degrees of rotation of the crankshaft of the engine and corresponding to prescribed positions of the pistons of the engine. The two periods are selected so that the ratio of the lengths of the two periods will change when one of the cylinders of the engine is misfiring. Misfiring is then detected based on the value of the ratio.

In one form of the present invention, misfiring is sensed by comparing the ratio with a reference value. The reference value can be a constant, or it can be a value which varies according to the current operating conditions of the engine.

In another form of the present invention, the ratio is used to calculate a value indicative of the current angular acceleration of the engine, and the calculated value is compared with a reference value to determine whether knocking is taking place.

The present invention is particularly suited for use with an internal combustion engine for an automobile, but it can be applied to internal combustion engines for other uses as well.

DESCRIPTION OF THE PREFERRED EMBODIMENTS

Figure 1:
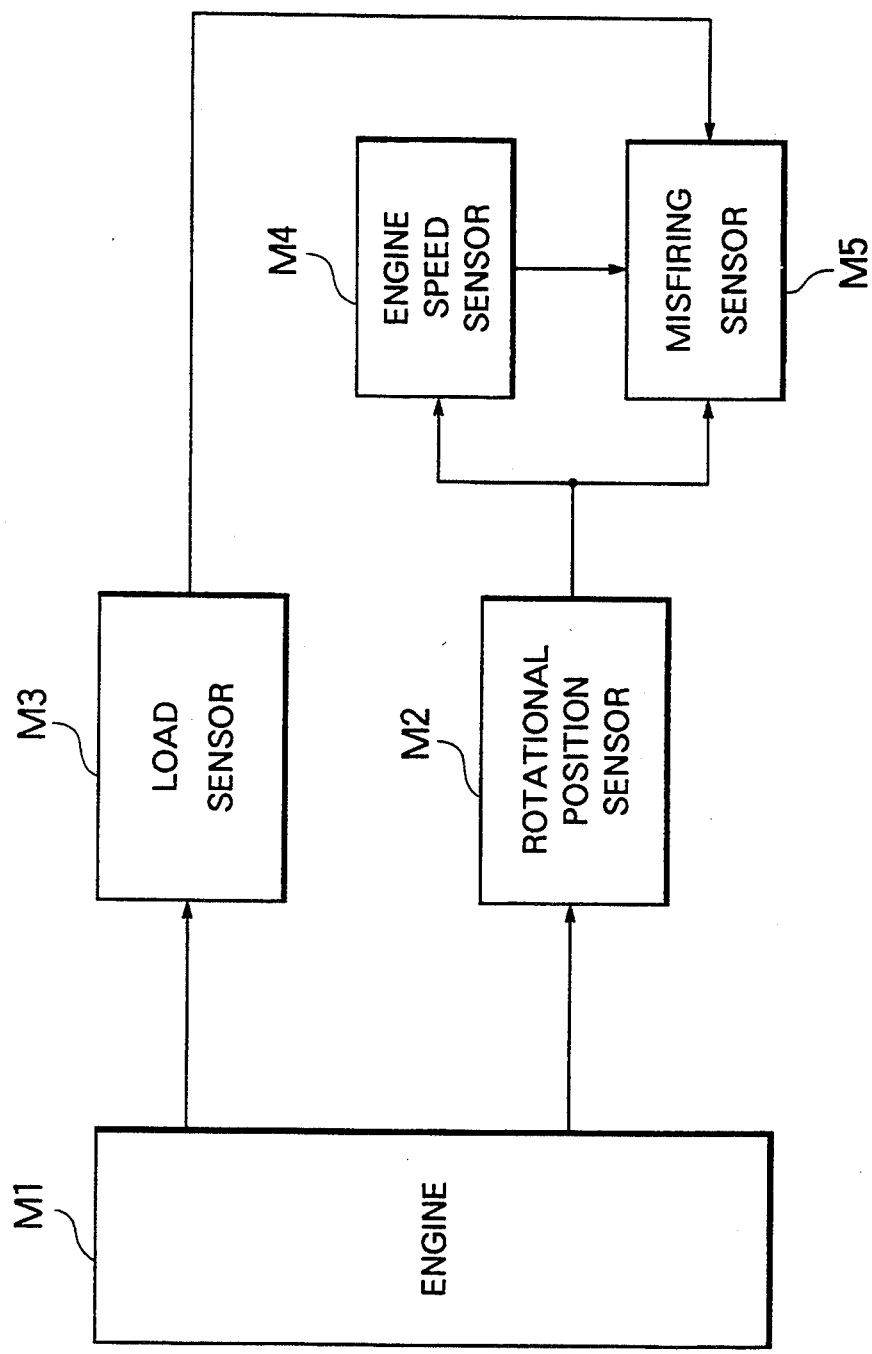
FIG. 1 is a block diagram conceptually illustrating the structure of a misfiring sensing apparatus according to the present invention.

A number of preferred embodiments of a misfiring sensing apparatus according to the present invention will now be described while referring to the accompanying drawings. FIG. 1 is a block diagram conceptually illustrating the structure of each of the embodiments. In this figure, a conventional internal combustion engine M1 for an unillustrated automotive vehicle is equipped with a rotational position sensor M2 and a load sensor M3. The engine M1 can have one or a plurality of cylinders, but the case will be described in which the engine M1 is a four-cylinder, four-cycle engine. The rotational position sensor M2 is a device that senses the rotation of a portion of the engine M1 and generates an electrical output signal from which it can be determined when the crankshaft of the engine M1 is at a prescribed rotational position. For example, the rotational position sensor M2 can sense the rotation of the crankshaft itself, of the camshaft, or a member rotated by one of these shafts, such as distributor shaft. The load sensor M3 senses an operating parameter of the engine M1 indicative of the engine load and generates a corresponding electrical output signal. Some examples of sensing devices that can be used as the load sensor M3 are an air flow sensor for sensing the air intake rate into the engine M1, a throttle opening sensor for sensing the degree of opening of a throttle valve for the engine M1, and an intake pressure sensor for sensing the air pressure in an intake manifold for the engine M1. Alternatively, the load sensor M3 can comprise more than one such sensing device. The output signal of the rotational position sensor M2 is provided to an engine speed sensor M4 and a misfiring sensor M5, and the output signal of the load sensor M3 is provided to the misfiring sensor M5. The engine speed sensor M4 calculates the rotational speed of the engine M1 based on the output signal of the rotational position sensor M2 and provides an output signal indicative of the engine rotational speed to the misfiring sensor M5. The misfiring sensor M5 determines the engine operating state based on the input signals from the load sensor M3 and the engine speed sensor M4. Furthermore, it determines whether misfiring is taking place in the engine M1 based on the ratio of the times required for two different periods, each period corresponding to a prescribed number of degrees of rotation of the crankshaft of the engine M1.

Figure 2:
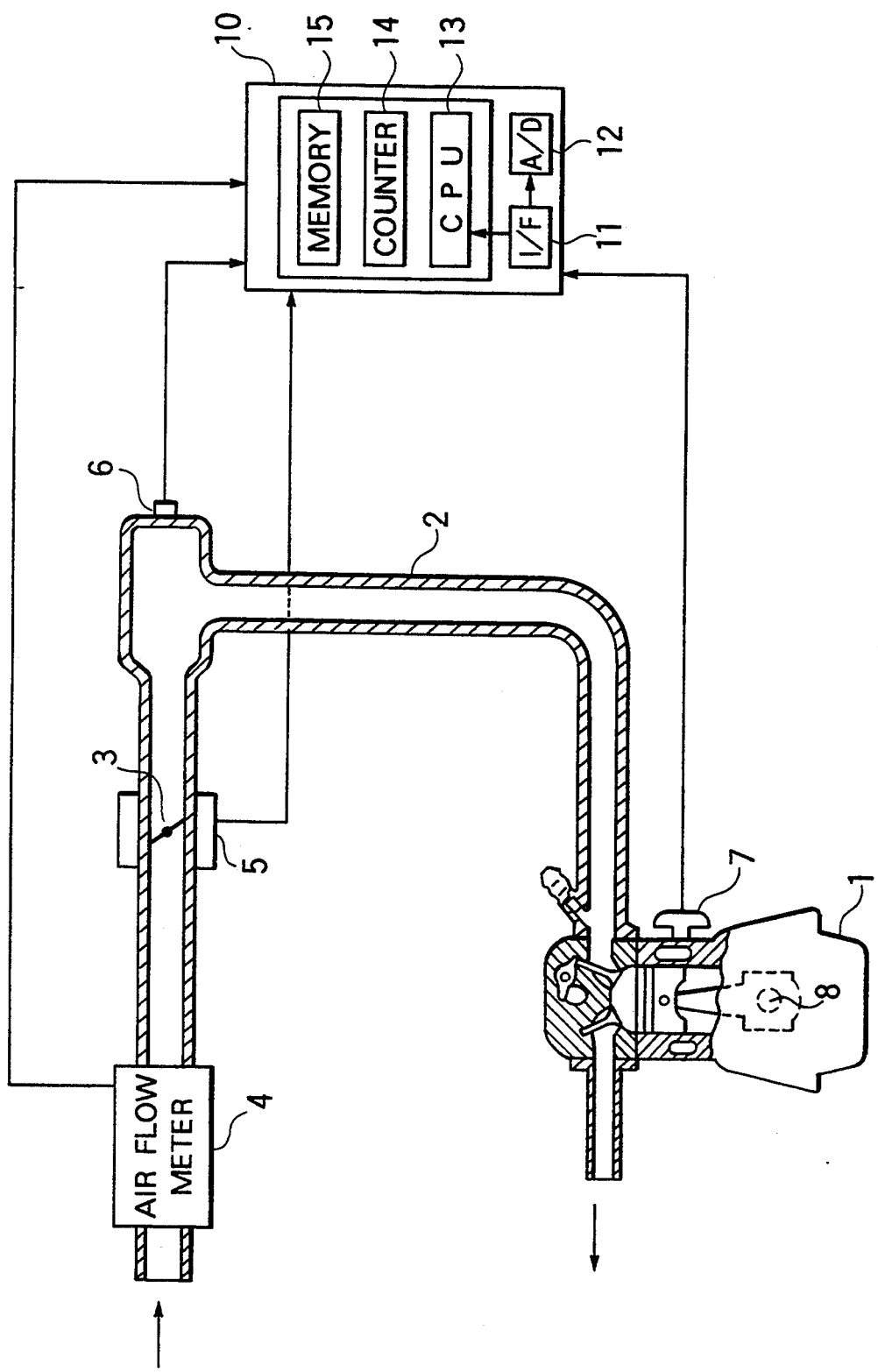
FIG. 2 is a schematic illustration of an engine equipped with a misfiring sensing apparatus according to the present invention.

FIG. 2 is a schematic diagram illustrating more concretely the structure of a misfiring sensing apparatus according to the present invention as applied to a multi-cylinder engine 1 of an unillustrated automotive vehicle. The engine 1 is equipped with an air intake pipe 2 on which a throttle valve 3 is rotatably mounted. The air intake pipe 2 is equipped with an air flow meter 4, a throttle opening sensor 5, and an intake air pressure sensor 6. The air flow meter 4 measures the amount of air passing into the air intake pipe 2 and generates a corresponding output signal. The throttle opening sensor 5 senses the degree of opening of the throttle valve 3 and generates a corresponding output signal. The intake air pressure sensor 6 senses the air pressure within the air intake pipe 2 and generates a corresponding output signal. The load sensor M3 of FIG. 1 may comprise one or more of elements 4, 5, and 6. A crankshaft position sensor 7 (corresponding to the rotational position sensor M2 of FIG. 1) is mounted on the engine 1 in a location where it can sense the rotation of a member that rotates in synchrony with the crankshaft 8 of the engine 1, such as an unillustrated flywheel mounted on the crankshaft 8. The crankshaft position sensor 7 generates an output signal at prescribed angular positions of the crankshaft 8.

The output signals of the air flow meter 4, the throttle opening sensor 5, the intake air pressure sensor 6, and the crankshaft position sensor 7 are provided to a control unit 10, which corresponds to the engine speed sensor M4 and the misfiring sensor M5 of FIG. 1. The exact structure of the control unit 10 is not critical, but preferably it is in the form of a microcomputer, such as a one-chip microcomputer. In the present embodiment, the control unit comprises an input interface circuit 11 that receives input signals from sensors 4–7, an analog/digital converter 12 that converts analog input signals from the sensors into digital signals, a CPU 13 that performs predetermined routines to sense misfiring, a counter 14 (such as a free running counter) that is incremented at prescribed intervals for measuring the lengths of time between prescribed rotational positions of the crankshaft 8, and one or more memory 15 (including a RAM and a ROM, for example) for storing routines performed by the CPU 13 and values used during calculations.

The principles of operation of a misfiring sensing apparatus according to one form of the present invention will now be explained while referring to FIGS. 3(a)–3(c), which are respectively graphs of the angular speed of the crankshaft 8 of the engine 1, the value of a ratio TU/TL which is used to determine misfiring, and the pressure in each cylinder as a function of crankshaft angle in a four-cycle, four-cylinder engine 1 having cylinders #1–#4 and operating at 1000 rpm with a fully open throttle valve. In these graphs, a crankshaft angle of 0 degrees corresponds to top dead center (TDC) during the compression stroke of the #1 cylinder of the engine 1. TL is the length of time required for a first period defined by two angular positions of the crankshaft 8 of the engine 1, and TU is the length of time required for a second period defined by two angular positions of the crankshaft 8. The crankshaft angles defining the periods TL and TU are chosen such that the ratio TU/TL will be different when the engine is operating normally than when one of the cylinders is misfiring. The number of degrees of crankshaft rotation in each of the periods is not critical, but in a first embodiment of the present invention, the first period having a length TL extends from 45° before top dead center (BTDC) until top dead center during the compression stroke of each cylinder, and the second period having a length TU extends from top dead center to 45° after top dead center (ATDC) during the combustion stroke of each cylinder.

Figure 3:
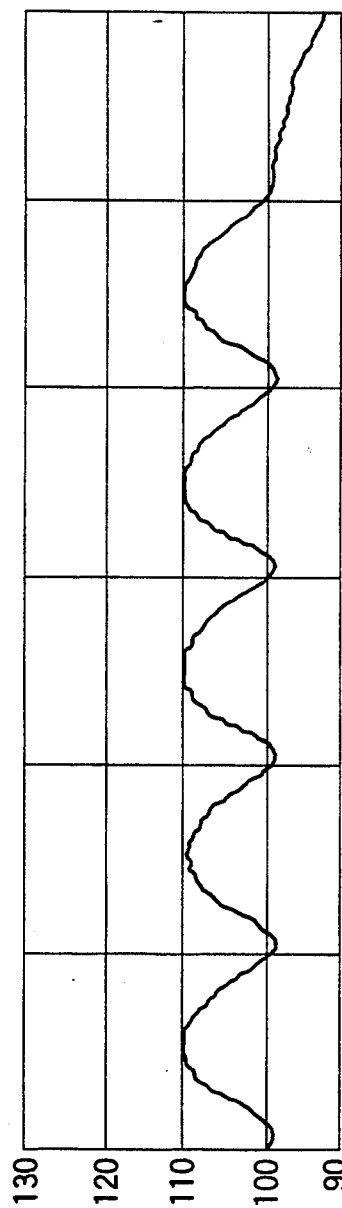
FIGS. 3(a)–3(c) are graphs of the crankshaft angular speed, the ratio TU/TL, and the cylinder pressure as a function of crankshaft angle during the operation of the engine of FIG. 2.
Figure 3:
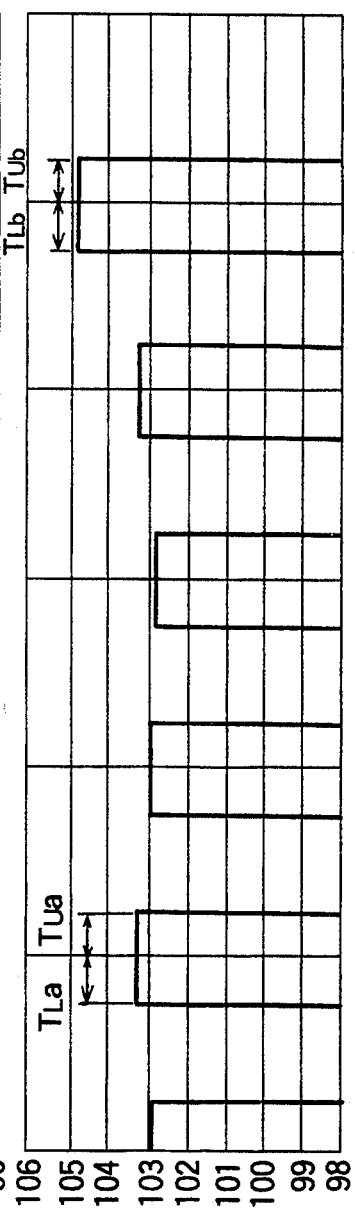
Figure 3:
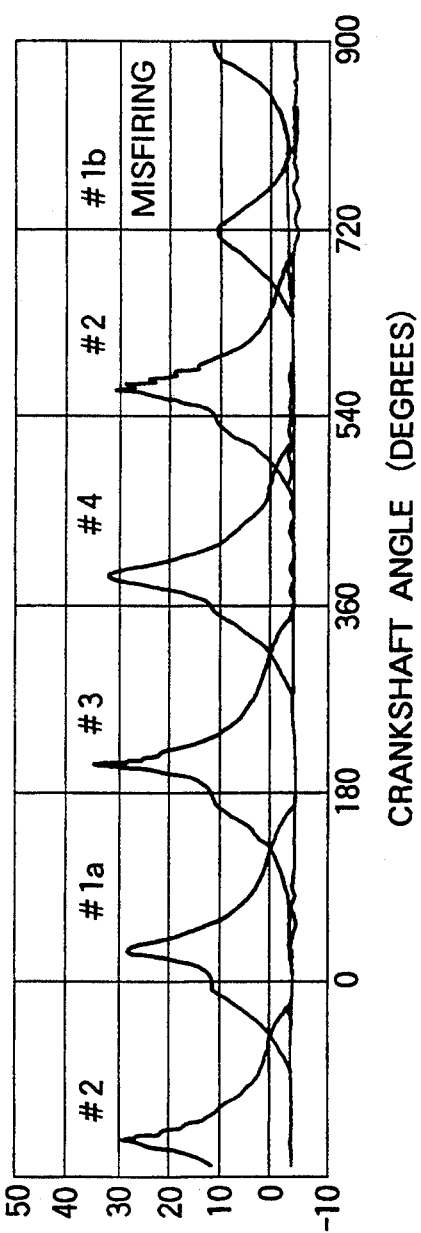

In FIG. 3(c), the cylinder pressures during only the compression and combustion strokes for each cylinder are shown. The wave form in FIG. 3(c) is for the case in which cylinders #2, #1, #3, #4, and #2 have successively undergone normal combustion, after which cylinder #1 misfires due to a problem in the ignition system, an improper fuel-air mixture, or the like. The curve marked #1a shows the cylinder pressure when cylinder #1 fires normally, while the curve marked #1b shows the cylinder pressure when cylinder #1 misfires. It can be seen that when the #1 cylinder misfires, the peak pressure occurring in that cylinder is much lower than for the cylinders firing normally. As a result, as shown in FIG. 3(a), the angular speed of the crankshaft decreases rather than increasing during the combustion stroke of cylinder #1.

In FIG. 3(b), $TL_a$ and $TU_a$ are the values of TL and TU when cylinder #1 fires normally, and $TL_b$ and $TU_b$ are the values of TL and TU when cylinder #1 misfires. It can be seen from FIG. 3(b) that $TU_b/TL_b$ is significantly larger than $TU_a/TL_a$. In the case of FIG. 3(b), TU/TL is approximately 103% for cylinders that are firing normally and is approximately 105% when the #1 cylinder misfires. The reason for this difference in magnitude is that $TL_a$ and $TL_b$ are approximately equal, since both occur during the compression stroke of cylinder #1, but since the angular speed of cylinder #1 is lower when misfiring takes place compared to during nominal operation, the time required ($TU_a$) for cylinder #1 to move from TDC to 45° ATDC during normal operation is less than the time required ($TU_b$) during misfiring. Thus, misfiring can be detected by sensing the magnitude of the ratio TU/TL and determining when the ratio exceeds a reference value corresponding to misfiring. In the case of FIG. 3(b), a suitable reference value would be between 103% and 105%.

The inverse ratio, TL/TU, can instead be used to detect misfiring. The ratio TL/TU falls rather than rise when misfiring occurs, so in this case, misfiring can be detected by determining when the ratio falls below a reference value.

Figure 4:
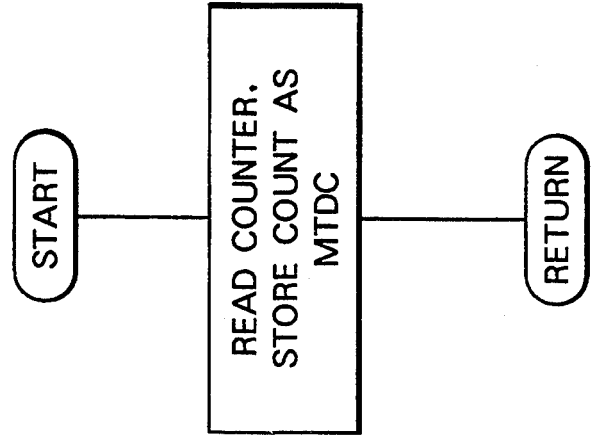
FIGS. 4–5 are flow charts of interrupt routines performed by the control unit of FIG. 2 during the operation of a first embodiment of the present invention.
Figure 4:
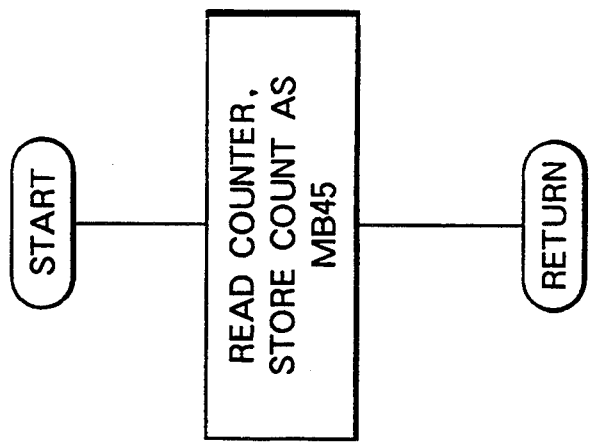

The operation of a first embodiment of the present invention in which the first and second periods both correspond to 45° of crankshaft rotation will be described in further detail while referring to FIGS. 4 and 5, which are flow charts of interrupt routines performed by the control unit 10 of FIG. 2. FIG. 4(a) illustrates an interrupt routine which is performed each time the crankshaft position is such that the piston in one of the cylinders of the engine is at 45° BTDC during its compression stroke. The occurrence of 45° BTDC during a compression stroke is detected based on the output signal of the crankshaft position sensor 7. In this interrupt routine, the current value of the counter 14 in the control unit 10 is read and stored in the memory 15 as MB45. A return is then performed. FIG. 4(b) illustrates an interrupt routine which is performed each time the crankshaft position is such that the piston in one of the cylinders of the engine is at top dead center during its compression stroke, as determined by the output signal of the crankshaft position sensor 7. In this routine, the current value of the counter 14 is read and stored in the memory 15 as MTDC, after which a return is performed.

Figure 5:
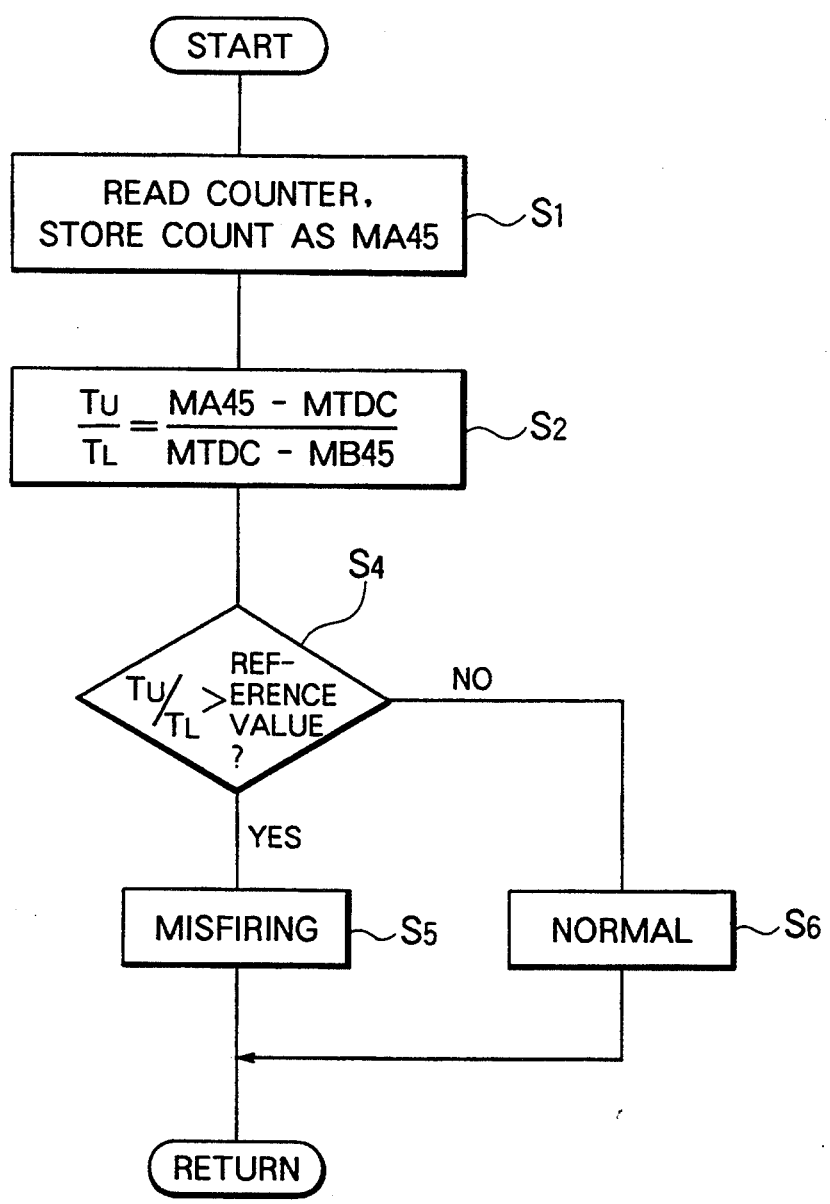

FIG. 5 illustrates an interrupt routine which is performed each time the crankshaft position is such that the piston in one of the cylinders of the engine is at 45° ATDC during its combustion stroke. In Step S1, the current value of the counter 14 is read and stored in the memory 15 as MA45. In Step S2, the magnitude of the ratio TU/TL is calculated from the formula TU/TL=(MA45−MTDC)/(MTDC−MB45). MA45−MTDC is proportional to the length of time for the piston of the cylinder now in its combustion stroke to move from top dead center to 45° ATDC, while MTDC−MB45 is proportional to the length of time for the piston of the same cylinder to move from 45° BTDC to top dead center during the compression stroke immediately preceding the present combustion stroke. In Step S4, the ratio TU/TL calculated in Step S2 is compared with a predetermined reference value indicative of misfiring. The reference value is a predetermined constant which is stored in the memory 15. If the ratio TU/TL is larger than the reference value, then in Step S5, it is determined that the cylinder now in its combustion stroke is misfiring, and a return is performed. If the ratio TU/TL is less than or equal to the reference value in Step S4, then in Step S6 it is determined that the cylinder now in its combustion stroke is operating normally, and a return is performed.

When a determination is made that a cylinder is misfiring, an unillustrated electronic control unit for controlling fuel injection of the engine can cut off the supply of fuel to the misfiring cylinder to prevent the release of uncombusted fuel from the engine. The electronic control unit can also energize a warning lamp or similar device to alert the driver of the vehicle on which the engine is mounted of the need to have the engine serviced. Devices for controlling an engine upon the detection of misfiring are well known to those skilled in the art, so a description of their structure and operation will be omitted.

It can be seen that a misfiring sensing apparatus according to the present invention can have an extremely simple structure and therefore can be inexpensively manufactured. Furthermore, it can sense misfiring over the entire speed range of an engine.

Figure 6:
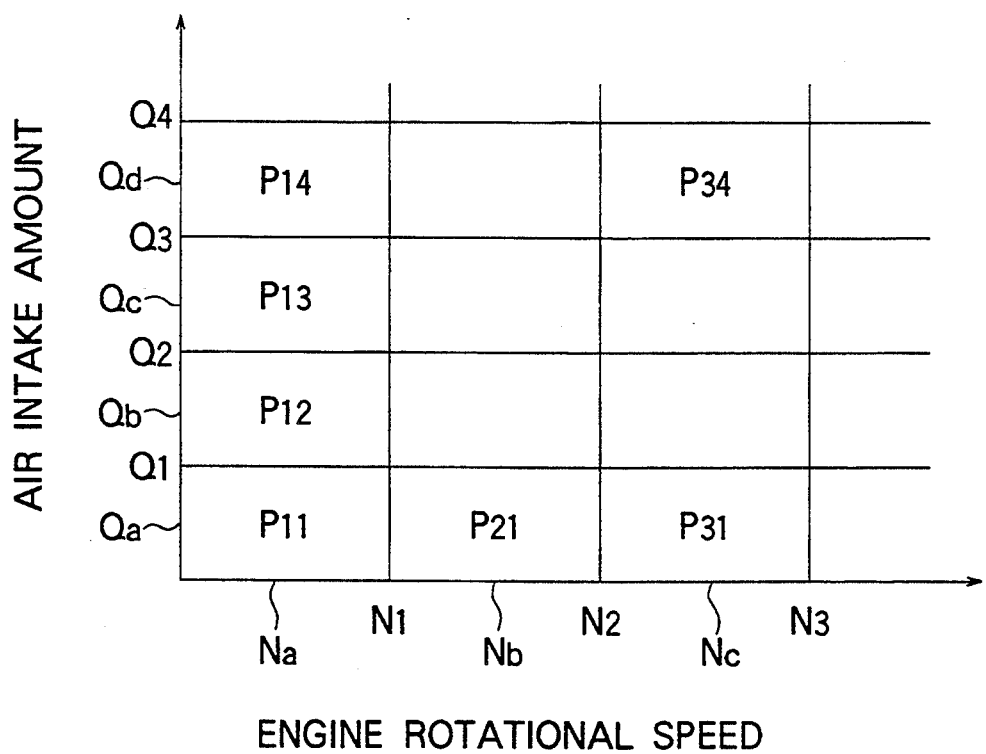
FIG. 6 schematically illustrates a memory map containing reference values as a function of air intake amount and engine rotational speed.

In the embodiment of FIG. 5, the reference value used for determining whether misfiring is taking place is a constant, but it is also possible for the reference value to be a value which varies in accordance with one or more engine operating conditions, such as the engine load or the engine rotational speed. The control unit 10 can determine the reference value based on the engine load, as indicated by the air intake amount Q determined from the output signal from the air flow meter 4, and the engine rotational speed calculated from the output signal of the crankshaft position sensor 7. The engine rotational speed can be easily determined by measuring the length of time between two prescribed crankshaft angles, such as between 45° BTDC and top dead center. The relationship among the air intake amount Q, the engine rotational speed N, and the reference value can be stored in the memory 15 as a memory map containing reference values P as a function of the air intake amount Q and the engine rotational speed N. FIG. 6 schematically illustrates an example of such a memory map. In this example, the air intake amount is divided into a plurality of regions Qa–Qd having values Q1–Q4 as upper limits, and the engine rotational speed is divided into three regions Na–Nc having values N1–N3 as upper limits. For every combination of one of regions Qa–Qd and regions Na–Nc, there is a corresponding reference value P stored in the memory map. The control unit 10 takes in the values of air intake amount Q and engine rotational speed N and determines into which region Qa–Qd the air intake amount Q falls and into which of regions Na–Nc the engine rotational speed N falls, and then it performs a map look-up operation to determine the corresponding reference value P. The number of regions into which the air intake amount and the rotational speed are divided is arbitrary and can be selected as desired.

Figure 7:
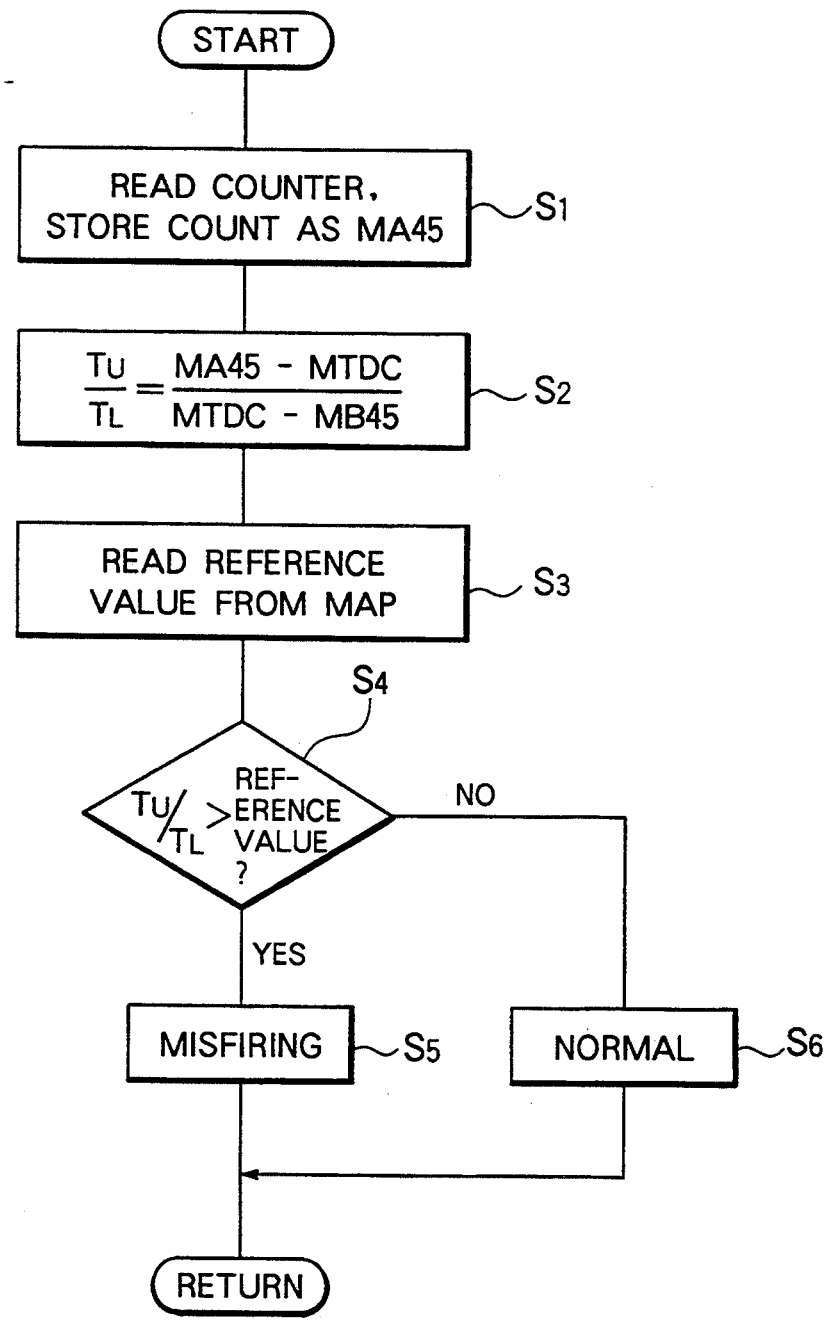
FIG. 7 is a flow chart of an interrupt routine performed by the control unit of FIG. 2 during the operation of a second embodiment of the present invention.

FIG. 7 is a flow chart of an interrupt routine performed in a second embodiment of the present invention every time the piston of one of the cylinders of the engine is at 45° ATDC during its combustion stroke. Steps S1 and S2 of this routine are identical to Steps S1 and S2 in the routine of FIG. 5. In Step S3, the control unit 10 refers to a memory map (such as the map illustrated in FIG. 6) in the memory 15 and determines the reference value P corresponding to the current air intake amount Q and engine rotational speed N. In Step S4, the ratio TU/TL calculated in Step S2 is compared with the reference value determined in Step S3. If the ratio TU/TL is larger than the reference value, then in Step S5, it is determined that misfiring is occurring in the cylinder now in its combustion stroke, and a return is performed. If the ratio is less than or equal to the reference value, then in Step S6, it is determined that the cylinder now in its combustion stroke is operating normally, and a return is performed.

As in the preceding embodiment, when it is determined that a cylinder is misfiring, an unillustrated electronic control unit can cut off the supply of fuel to the misfiring cylinder and generate a warning to the driver of the vehicle in which the engine is installed.

In accordance with this embodiment, the reference value is chosen so as to be suitable for the current operating conditions of the engine, so misfiring can be sensed more accurately.

The memory map containing the relationship of the reference value to the air intake amount and the engine rotational speed is normally permanently stored in the memory 15 at the time of manufacture of the apparatus. The reference values contained in the memory map are typically averages of reference values found to be suitable for a large number of different engines. However, nominally identical engines vary from one another due to manufacturing discrepancies, and since the values in the memory map are averages, they may not be the optimal values for any given engine. Furthermore, even if the reference values in the memory map are optimal at the time that the engine is manufactured, as the engine ages, the original reference values in the memory map may become less appropriate.

This problem is solved by a third embodiment of the present invention in which a memory map is updated based on the current operating characteristics of the engine to which it is actually applied. The overall structure of this embodiment is the same as shown in FIGS. 1 and 2. In this embodiment, the memory 15 includes a non-alterable memory in which a first memory map (such as the one illustrated in FIG. 6) is permanently stored, and an alterable memory containing a second memory map into which the data from the first memory map are written at the start of operation of the embodiment and then subsequently updated.

As in the preceding embodiment, the interrupt routines illustrated in FIGS. 4(a) and 4(b) are performed each time the output signal of the crankshaft position sensor 7 indicates that one of the pistons of the engine is at 45° BTDC or at top dead center, respectively, during its compression stroke.

Figure 8:
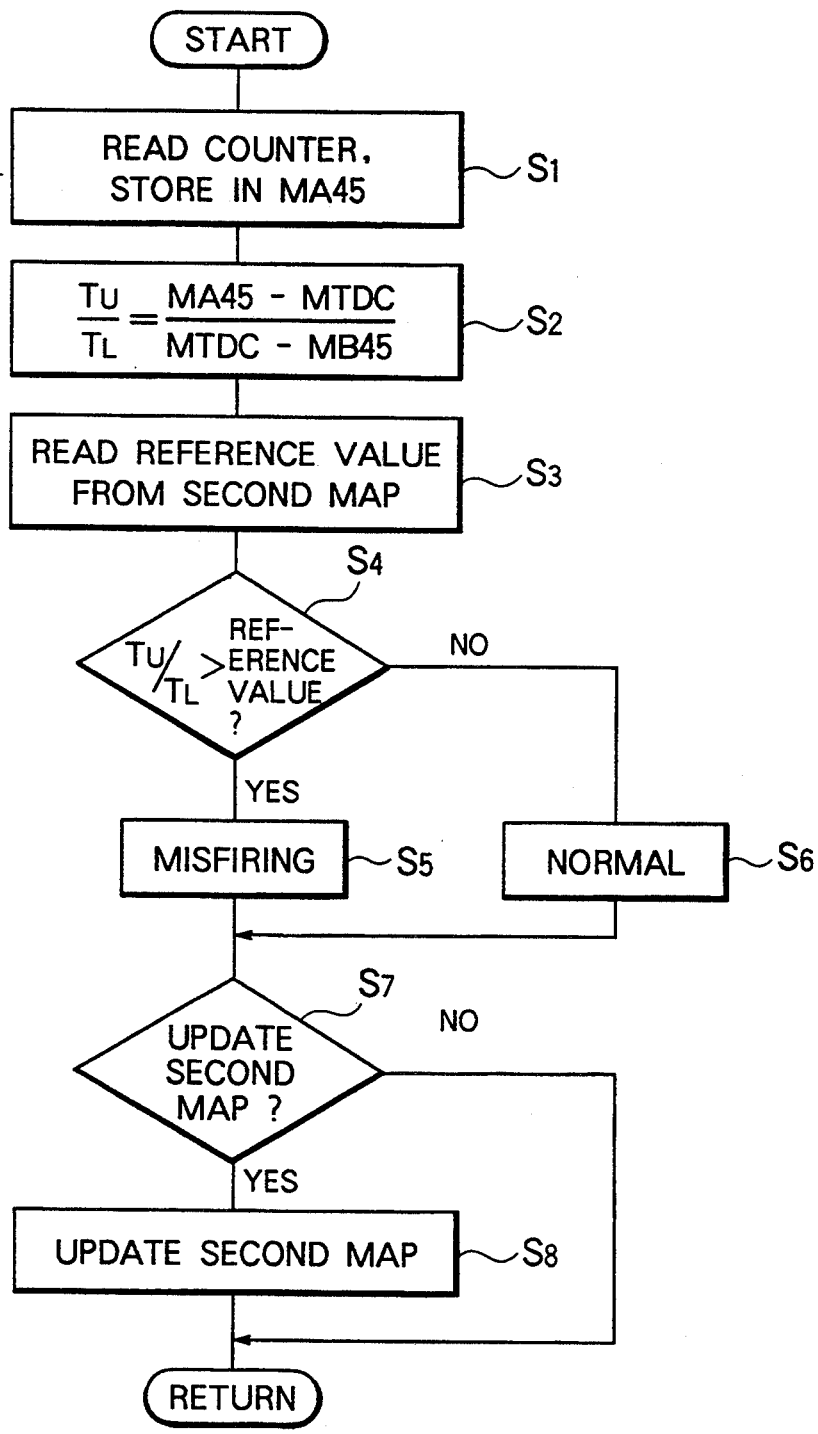
FIG. 8 is a flow chart of an interrupt routine performed by the control unit of FIG. 2 during the operation of a third embodiment of the present invention.

Whenever one of the pistons of the engine is at 45° ATDC during its combustion stroke, the interrupt routine of FIG. 8 is performed instead of the interrupt routine of FIG. 7. Prior to the first time that the routine of FIG. 8 is performed, the data from the first memory map is read into the second memory map in the alterable memory. Steps S1–S6 of this routine are identical to Steps S1–S6 in the routine of FIG. 7, except that in Step S3, the reference value is read from the second map (in the alterable memory) rather than from the first map (in the non-alterable memory). After a determination is made in Step S5 or S6 as to whether the cylinder now in its combustion stroke is misfiring, in Step S7, it is determined whether the engine operating conditions are suitable for updating the second memory map. An example of suitable conditions for updating the second memory map are when the engine is operating normally (as determined in Step S6) and the engine rotational speed has remained constant for a prescribed length of time. If the conditions are not suitable for updating the second map, then a return is performed, but if the conditions are suitable, then in Step S8, the second map is updated so that the reference value corresponding to the present air intake amount Q and engine rotational speed N is replaced by a value based on the present value of the ratio TU/TL determined in Step S2. For example, the reference value can be set equal to the present value of TU/TL, or it can be set equal to the present value of TU/TL plus a prescribed margin. Alternatively, the reference value can be set equal to an average of TU/TL over a prescribed number of rotations of the crankshaft. A return is then performed.

As in the preceding embodiment, when it is determined that a cylinder is misfiring, an unillustrated electronic control unit can cut off the supply of fuel to the misfiring cylinder and generate a warning to the driver of the vehicle in which the engine is installed.

In this manner, the values in the second memory map are set to value which are optimal for the particular engine to which the present invention is applied. Therefore, the effect of manufacturing discrepancies or aging of the engine on the accuracy of misfiring sensing can be minimized.

Figure 9:
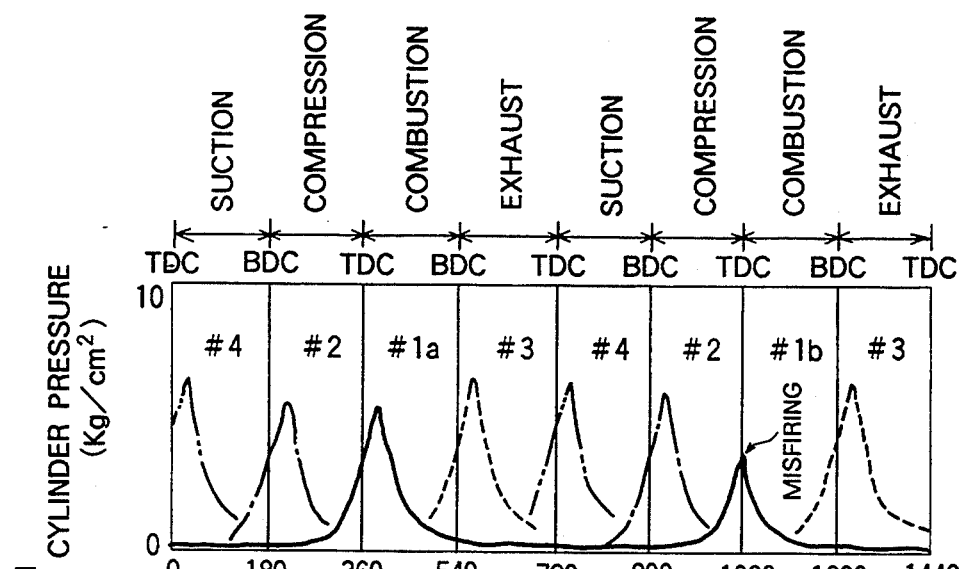
FIGS. 9(a)–9(d) are graphs of the cylinder pressure, the output of the crankshaft position sensor, the crankshaft angular speed, and the ratio TU/TL as a function of crankshaft angle during the operation of a fourth embodiment of the present invention.
Figure 9:
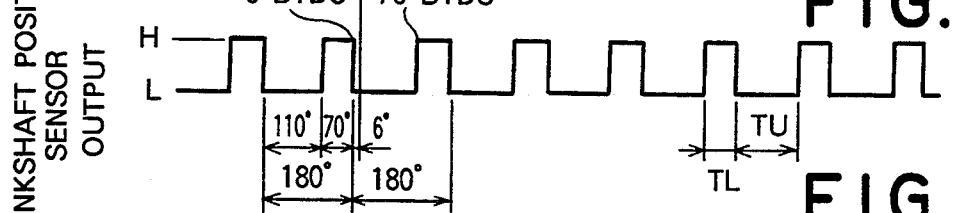
Figure 9:
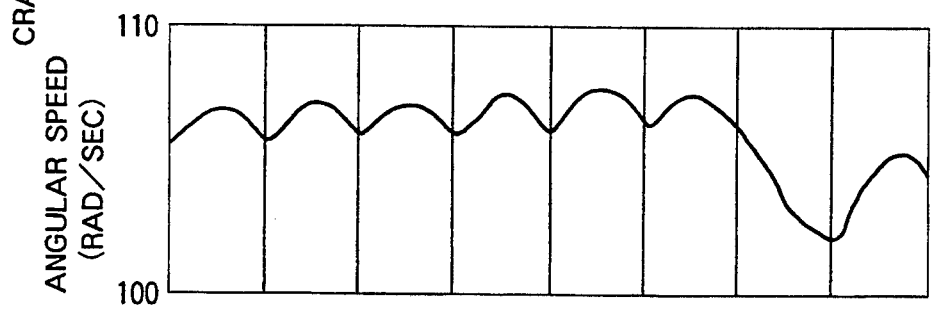
Figure 9:
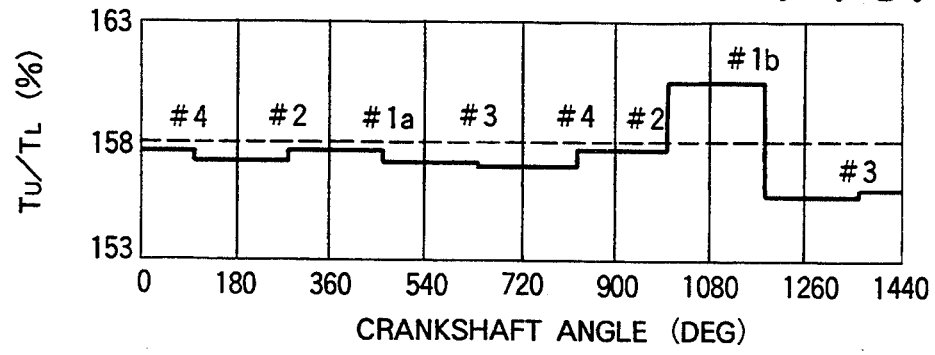

In the preceding embodiments, the first and second periods of crankshaft rotation having lengths TL and TU, respectively, correspond to the same number of degrees of crankshaft rotation (45° for each period) and are symmetric with respect to top dead center during the compression stroke of each cylinder. However, the relative lengths of the first and second periods as measured in degrees of crankshaft rotation and their locations with respect to top dead center can be different from in the preceding embodiments. FIGS. 9(a)–9(b) are wave form diagrams for the operation of a fourth embodiment of the present invention in which the first and second periods have different lengths as measured in degrees of crankshaft rotation. In this embodiment, the first period having length TL extends from 76° BTDC until 6° BTDC during the compression stroke of a cylinder, and the second period having length TU extends from 6° BTDC of a cylinder until 76° BTDC of the next cylinder in the firing order of the engine. The first period therefore equals 70° of crankshaft rotation, and the second period equals 110° of crankshaft rotation. In order to make it easy to determine the start and end of the first and second periods, in the present embodiment, the crankshaft position sensor 7 is configured so as to generate an output signal as shown in FIG. 9(b) which changes levels each time any piston of the engine is at 76° BTDC or 6° BTDC in its compression stroke. A portion of the output signal is shown in greater detail in FIG. 10. It alternates between a high level H and a low level L with a period of 180° of crankshaft rotation, with the signal being high for 70° and low for 110° of crankshaft rotation. The signal has a rising edge each time one of the pistons of the engine is at 76° BTDC and a falling edge each time one of the pistons is at 6° BTDC during its compression stroke.

FIG. 9(a) shows the pressure in each cylinder of the engine in the case when the #1 cylinder misfires. The curve marked #1a indicates normal operation of the #1 cylinder and the curve marked #1b indicates misfiring of the #1 cylinder. It can be seen that when misfiring occurs, the peak pressure in the #1 cylinder falls well below the peak pressure in the other cylinders. Furthermore, as shown in FIG. 9(c), when the #1 cylinder misfires, the angular speed of the crankshaft falls during the combustion stroke of the #1 cylinder and continues to fall until the ignition of the #3 cylinder. As a result, as shown in FIG. 9(d), the ratio TU/TL for the #1 cylinder when it misfires (marked #1b) increases with respect to the ratio for normally firing cylinders. By comparing TU/TL with a reference value, it can be determined whether a cylinder is misfiring. In the case of FIG. 9(d), the reference value can be set at approximately 158%.

The curve marked #1b shows the case in which the #1 cylinder completely misfires, i.e., where there is no combustion in the #1 cylinder at all. When the #1 cylinder only partially misfires and some combustion takes place, then the peak pressure in the #1 cylinder will reach a value somewhere between that shown by curve #1a for normal operation and the value shown by curve #1b for complete misfiring.

Figure 11:
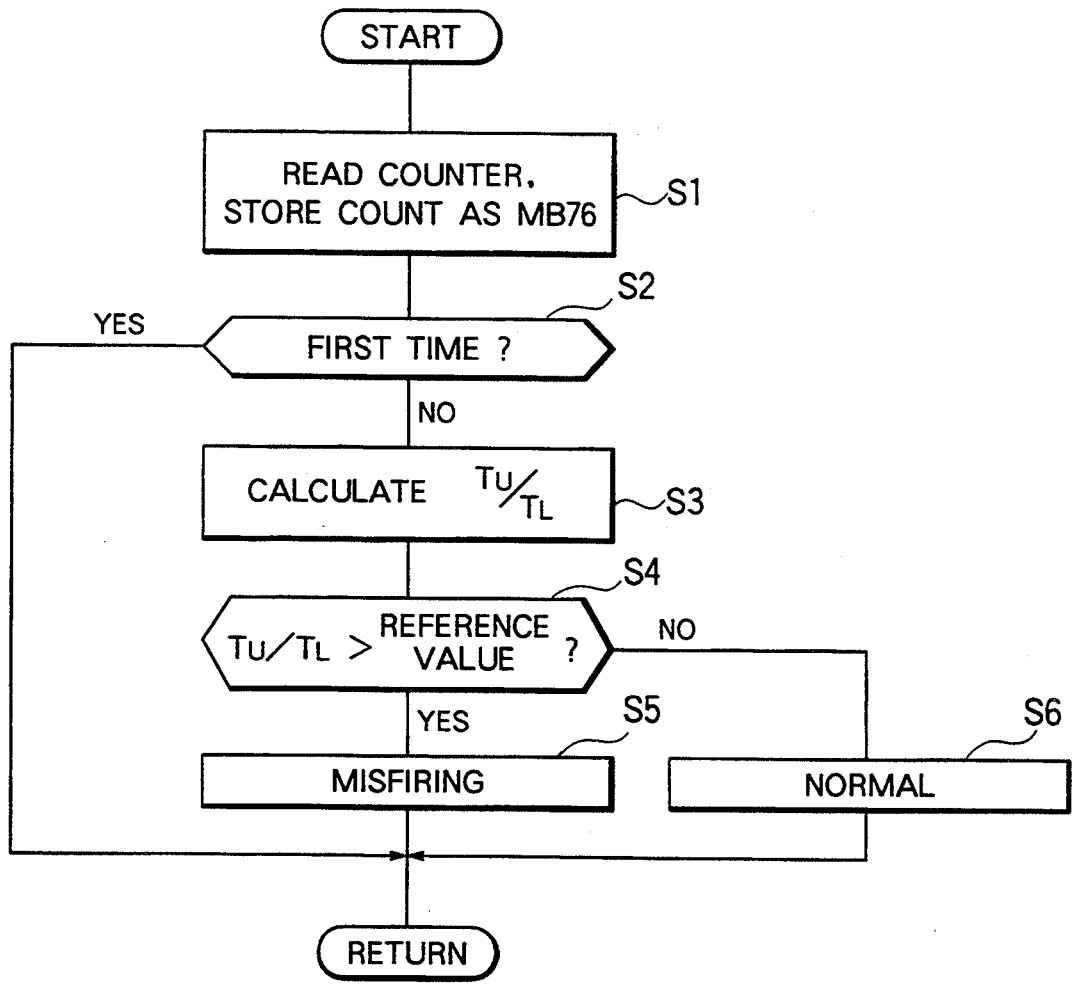
FIGS. 11 and 12 are flow charts of interrupt routines performed by the control unit in the fourth embodiment of the present invention.
Figure 12:
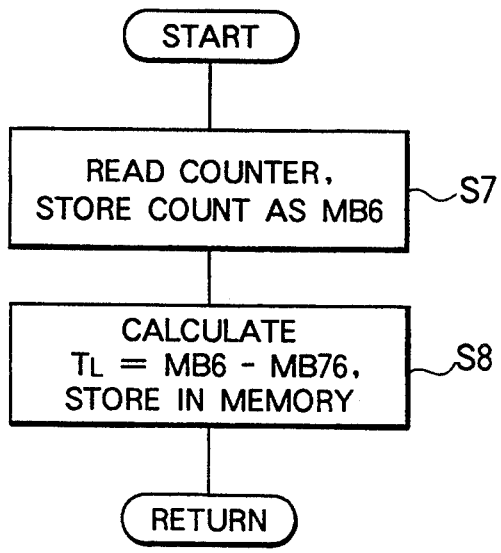

FIGS. 11 and 12 are flow charts of interrupt routines performed by the control unit 10 in the fourth embodiment of the present invention to sense misfiring. The interrupt routine of FIG. 11 is performed upon each rising edge of the output signal of the crankshaft position sensor 7 (which occurs each time one of the pistons of the engine is at 76° BTDC in its compression stroke) and the interrupt routine of FIG. 12 is performed upon each falling edge of the output signal of the crankshaft position sensor 7 (which occurs each time one of the pistons is at 6° BTDC in its compression stroke).

In Step S1 of FIG. 11, the current value of the counter 14 is read and stored in the memory 15 as MB76. In Step S2, it is determined by referring to a flag whether this is the first time that the routine has been performed. The flag is initially set to indicate an initial pass through the routine. If in Step S2, the flag is still set to the value indicating the first pass through the routine, then the flag is set to a value indicating that a first pass has already been performed and a return is executed without performing any further steps, since during the first pass through the routine, there is not yet sufficient information to sense misfiring.

The control unit 10 then waits until the output signal of the crankshaft position sensor 7 indicates that the piston of the cylinder presently in its compression stroke has reached 6° BTDC as indicated by a falling edge of the output signal, and the interrupt routine of FIG. 12 is performed. In Step S7, the value of the counter 14 is read and stored in the memory 15 as MB6, and in Step S8, the length of the second period TL is calculated from the formula MB6−MB76 and stored in the memory 15. A return is then performed.

When the piston of the next cylinder in the firing order reaches 76° BTDC in its compression stroke as indicated by the next rising edge of the output signal of the crankshaft position sensor 7, the interrupt routine of FIG. 11 is again performed. In Step S1, the value of MB76 in the memory 15 is updated, and in Step S2, it is determined from the flag that it is not the first pass through the routine, so the routine proceeds to Step S3. In this step, the length TU of the second period extending from 6° BTDC until 76° BTDC is calculated by the formula MB76−MB6, and the value of the ratio TU/TL is calculated. In Step S4, the ratio TU/TL is compared with a predetermined reference value. If the ratio is greater than the reference value, then in Step S5, it is determined that the cylinder now in its combustion stroke is misfiring, and a return is performed. If the ratio is less than or equal to the reference value, then in Step S6 it is determined that the cylinder is firing normally, and a return is performed.

As in the preceding embodiments, when it is determined that a cylinder is misfiring, an unillustrated electronic control unit can be made to cut off the supply of fuel to the misfiring cylinder and to generate a warning for the driver of the vehicle in which the engine is installed.

As in the preceding embodiments, the reference value can be a predetermined constant, or it can be a value which varies in accordance with the current operating conditions of the engine. It is also possible to update the reference value as in the embodiment of FIG. 8.

The embodiment of FIGS. 9–12 has the advantage that only two interrupt routines are performed by the control unit 10 to sense misfiring, so computations are simplified compared to the preceding embodiments in which three interrupt routines are performed. Furthermore, the output signal from the crankshaft position sensor 7 can have a very simple form, so signal processing is made easier.

Figure 10:
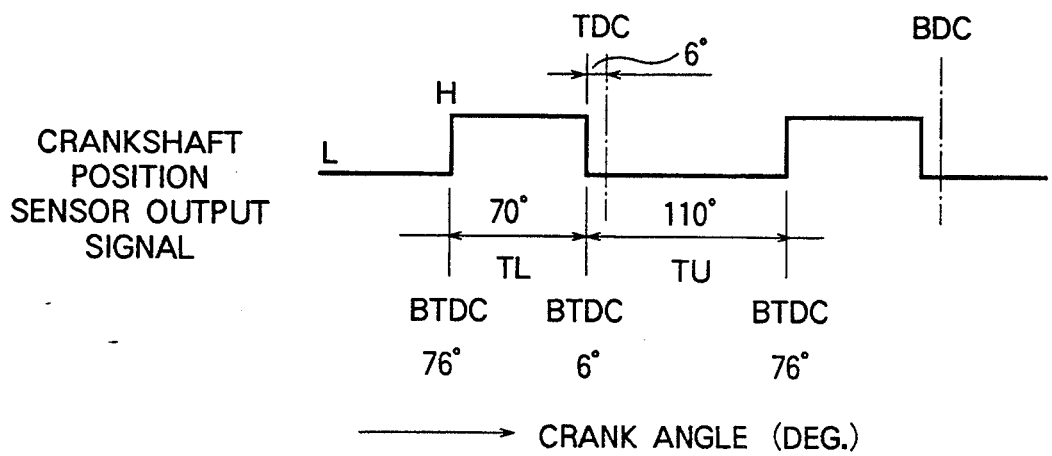
FIG. 10 is an enlarged view of a portion of FIG. 9(b).

This embodiment has the additional advantage that the crankshaft position sensor output signal having the form shown in FIG. 10 can be used for controlling the ignition timing of the engine. For example, the rising edge of the signal at 76° BTDC can be used to indicate the timing for initiating the supply of current to an ignition coil, and the falling edge occurring at 6° BTDC can be used to indicate the timing for cutting off the current to the ignition coil, thereby producing firing of a spark plug. Therefore, the crankshaft position sensor 7 can serve two functions, and it is not necessary to provide separate rotational position sensors for controlling the ignition timing and for sensing misfiring.

Figure 14:
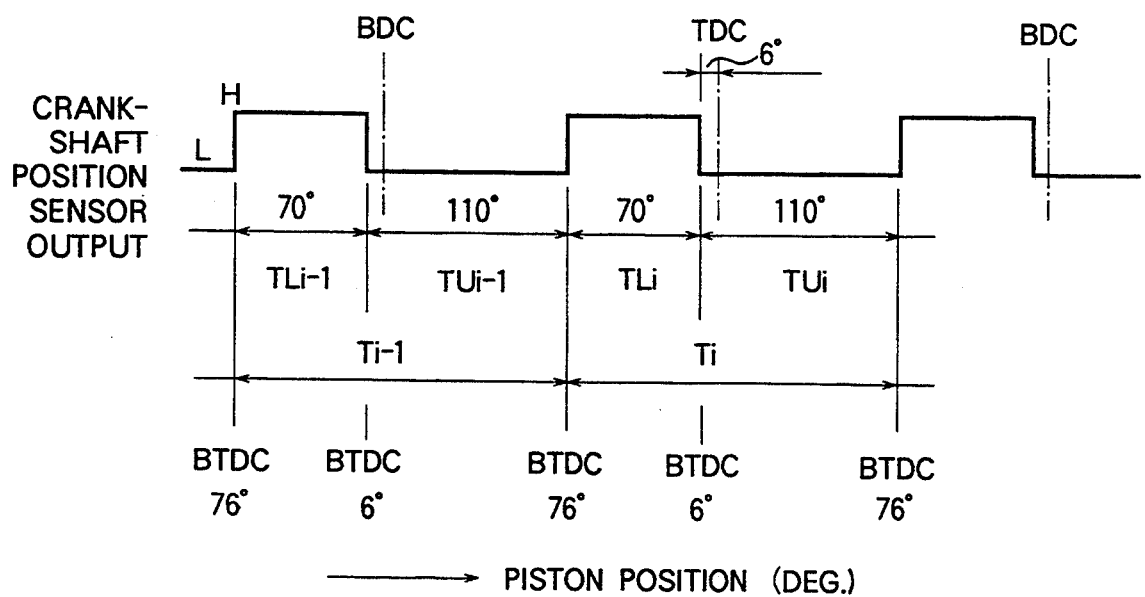
FIG. 14 is an enlarged view of a portion of FIG. 13(b).
Figure 13:
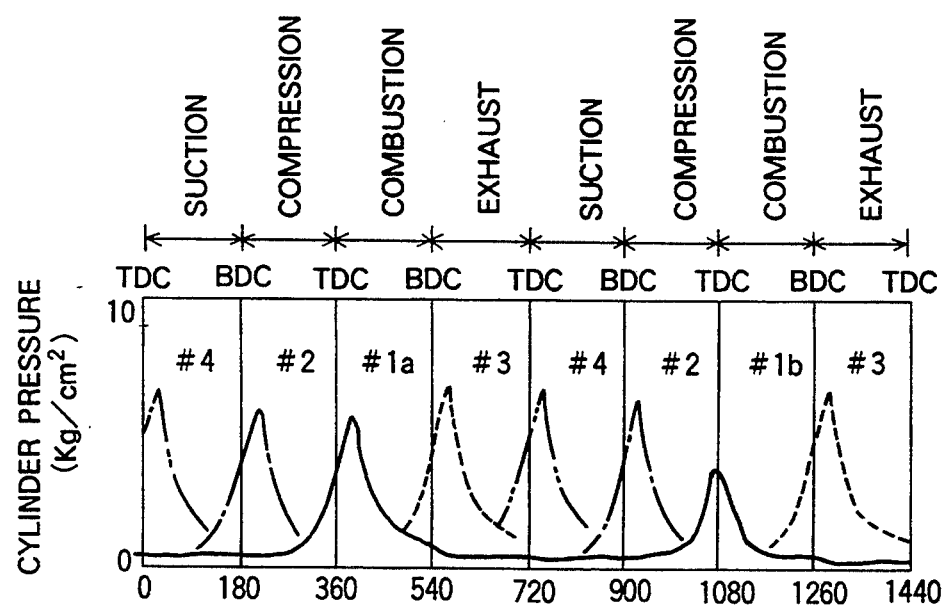
FIGS. 13(a)–13(d) are graphs of the cylinder pressure, the output of the crankshaft position sensor, the crankshaft angular speed, and the acceleration as a function of crankshaft angle during the operation of a fifth embodiment of the present invention.
Figure 13:
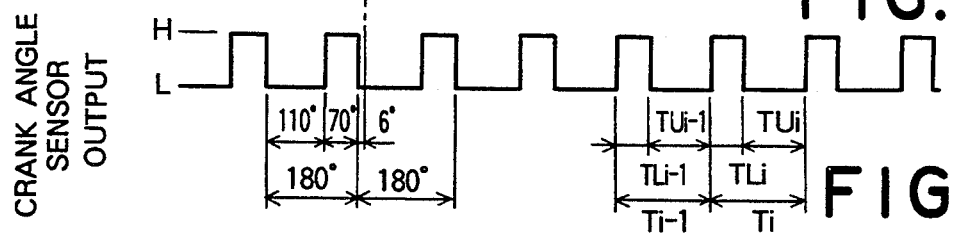
Figure 13:
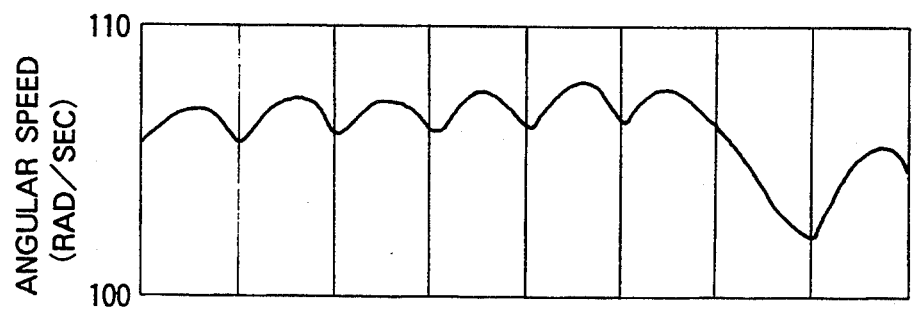
Figure 13:
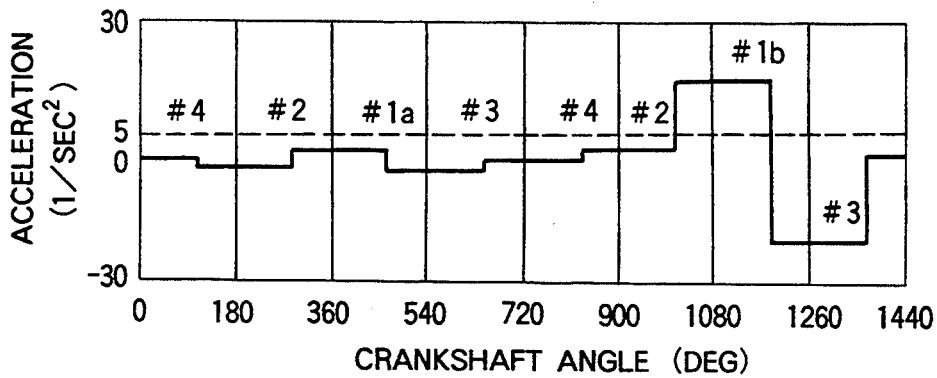

In the preceding embodiments, misfiring is sensed by sensing the magnitude of the ratio TU/TL of the lengths of two periods. In another form of the present invention, misfiring is detected by sensing the acceleration of the crankshaft of the engine. A fifth embodiment of the present invention in which misfiring is detected in this manner will now be described while referring to FIGS. 13–15. The overall structure of this embodiment is the same as that illustrated in FIGS. 1 and 2, and it differs from the preceding embodiments primarily with respect to the software routines executed by the control unit 10. FIGS. 13(a)–13(d) are wave form diagrams for the operation of this embodiment. As shown in FIG. 13(d) and in greater detail in FIG. 14, the crankshaft position sensor 7 of this embodiment generates an output signal similar to that shown in FIG. 10. Namely, the signal alternates between a high level H and a low level L with a period of 180 degrees of crankshaft rotation, with the signal being high for 70° and low for 110° of crankshaft rotation. The signal has a rising edge each time one of the pistons of the engine is at 76° BTDC and a falling edge each time one of the pistons is at 6° BTDC during its compression stroke. A first period having a length TL extends from 76° BTDC until 6° BTDC during the compression stroke of a cylinder, and a second period having a length TU extends from 6° BTDC during the compression stroke of a cylinder until 76° BTDC during the compression stroke of the next cylinder in the firing order. In FIG. 14, T is the period of the output signal from 76° BTDC during the compression stroke of one piston until 76° BTDC during the compression stroke of the piston of the next cylinder in the firing order. A subscript i indicates a value for the cylinder currently in its compression or combustion stroke, and a subscript i-1 indicates a value for the preceding cylinder in the firing order.

FIG. 13(a) shows the cylinder pressure during the operation of this embodiment in the case in which cylinder #1 misfires. The wave form marked #1a shows the case when cylinder #1 fires normally, and the wave form marked #1*b* shows the case in which this cylinder misfires. FIG. 13(*c*) shows the angular speed of the crankshaft of the engine, and FIG. 13(*d*) shows a value of acceleration of the crankshaft which is calculated in this embodiment. The acceleration is defined so that when a cylinder misfires, the acceleration will exceed a reference value, indicated by the dashed line in FIG. 13(*d*). In this example, the reference value is 5/sec$^2$, but it is not restricted to this value.

In this embodiment, at each occurrence of 6° BTDC during the compression stroke of a cylinder (i.e., upon each rising edge of the output signal of the crankshaft position sensor 7), the control unit 10 performs the interrupt routine illustrated in FIG. 12 which calculates the length TL of the first period and stores the value in the memory 15.

Figure 15:
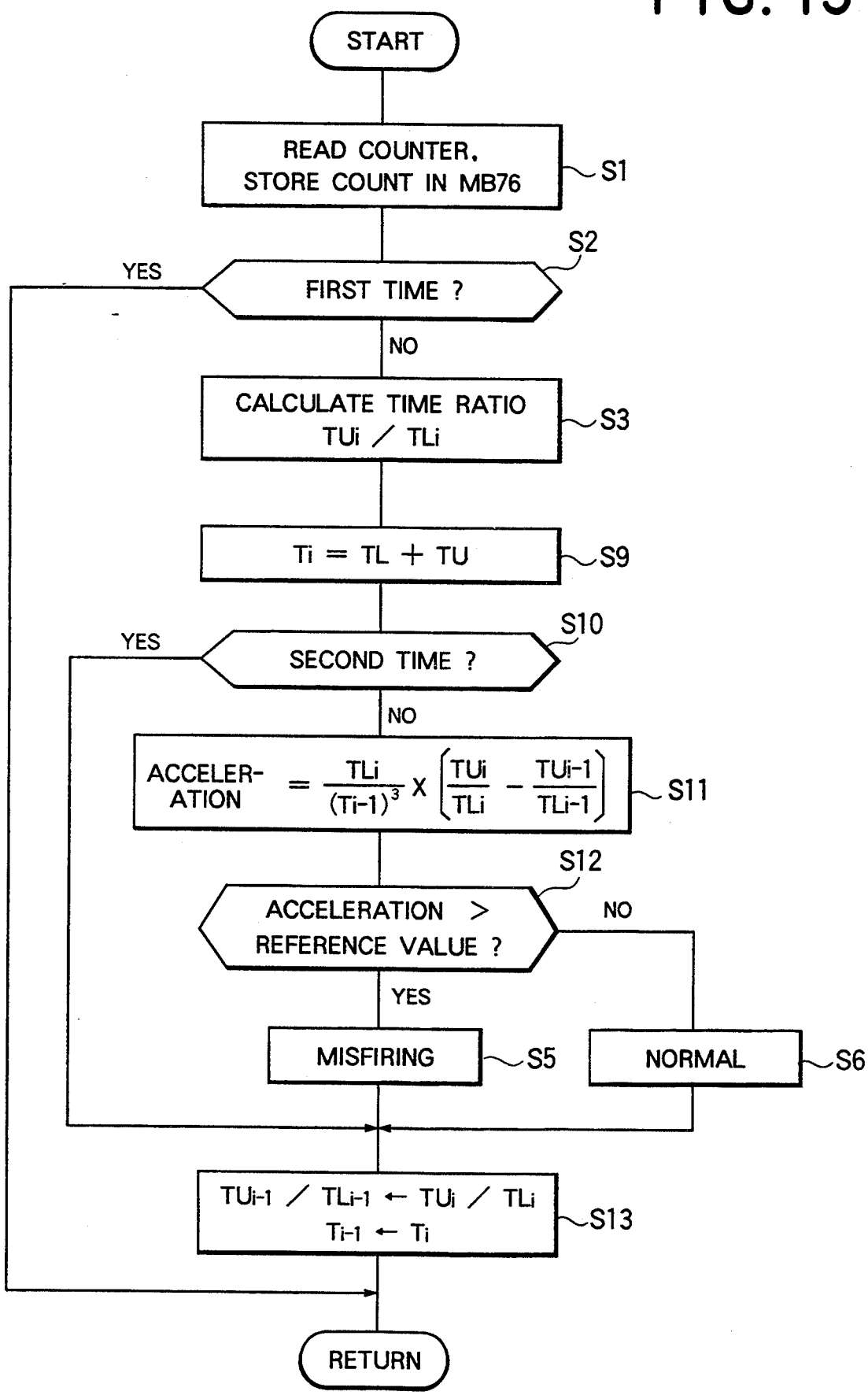
FIG. 15 is a flow chart of an interrupt routine performed by the control unit of the fifth embodiment of the present invention.

At each occurrence of 76° BTDC during the compression stroke of a cylinder (i.e., upon each falling edge of the output signal of the crankshaft position sensor 7), the control unit 10 performs the interrupt routine illustrated in FIG. 15, which determines whether misfiring is taking place.

In Step S1 of FIG. 15, the value of the counter 14 is read and stored in the memory 15 as MB76. In Step S2, it is determined whether this is the first pass through the routine by referring to a flag. If the flag indicates that a first pass through the routine has already been performed, then the flag is set to a value indicating the second pass through the routine and a return is performed. However, if the flag already indicates that this is higher than the first pass through the routine, in Step S3, the length $TU_i$ of the second period is calculated from the equation $TU_i = MB76 - MB6$, using the value of MB6 determined in the interrupt routine of FIG. 12, and then the ratio $TU_i/TL_i$ is calculated. In Step S9, the length $T_i$ of one period of the output signal of the crankshaft position sensor is calculated as $T_i = TL_i + TU_i$. In Step S10, it is determined by referring to the flag whether this is the second pass through the routine. If it is, then the flag is set to a value indicating that two passes have been performed and the routine jumps to Step S13, in which the value of $TU_i/TL_i$ calculated in Step S3 is stored in the memory 15 as $TU_{i-1}/TL_{i-1}$, and the value of $T_i$ calculated in Step S9 is stored in the memory 15 as $T_{i-1}$ in preparation for the next pass through the routine of FIG. 15. Here, the subscript i indicates a value corresponding to a cylinder for which misfiring is presently being determined, and the subscript i-1 indicates a value for the preceding cylinder in the firing order. After Step S13, a return is performed.

If in Step S10 the flag indicates that two passes through the routine have already been performed, then in Step S11, a value indicating the acceleration of the crankshaft in units of 1/sec$^2$ is calculated from the formula $$\text{Acceleration} = TL_i/(T_{i-1})^3 \times [TU_i/TL_i - TU_{i-1}/TL_{i-1}] \quad (1)$$

In Step S12, it is determined whether the acceleration calculated in Step S11 is greater than a predetermined reference value. If the acceleration is larger, then in Step S5 it is determined that misfiring is taking place, whereas if the acceleration is less than or equal to the reference value, it is determined that the cylinder is operating normally. After Step S5 or S6 is performed, in Step S13, the current ratio $TU_i/TL_i$ and the current period $T_i$ become the old values $TU_{i-1}/TL_{i-1}$ and $T_{i-1}$ in preparation for the next pass through the routine. A return is then performed.

The routines of FIGS. 12 and 15 are repeated each time the crankshaft position is such that one of the pistons of the engine is at 6° BTDC or 76° BTDC during its compression stroke, and the acceleration of the crankshaft is calculated for each cylinder in succession.

When it is determined in Step S5 that a cylinder is misfiring, an unillustrated electronic control unit can be made to cut off the supply of fuel to the misfiring cylinder and generate a warning to the driver of the vehicle in which the engine is installed, as in the preceding embodiments.

The basis for Equation (1) used in Step S11 of FIG. 15 is as follows. The angular acceleration $\alpha$ in radians/sec$^2$ of the crankshaft is expressed by $$\alpha = (\omega_i - \omega_{i-1})/T_i \quad (2)$$

wherein
$\omega_i$ = angular speed of the crankshaft during period $T_i$, and
$T_i$ = length of period of output signal of crankshaft position sensor 7.

The angular speed $\omega_i$ in radians/sec is expressed by $$\omega_i = 4\pi/c \times (1/T_i) \quad (3)$$

wherein c is the number of cylinders in the engine.
Combining Equations (6) and (7) gives $$\alpha = 4\pi/c \times (1/T_i) \times \{T_i/T_i^2 - [T_{i-1}/(T_{i-1})^2]\} \quad (4)$$

If $T_{i-1} = T_i + \Delta T_i$, and if $\Delta T_i^2 << 1$, then Equation (4) can be approximated by the following equation:

$$\alpha = 4\pi/c \times (T_i - T_{i-1})/T_i^3 \quad (5)$$

The length TL gives information on the amount of air packed into a cylinder during a compression stroke. If the amount of air packed into consecutive cylinders in the firing order is equal, i.e., if $TL_i = TL_{i-1}$, then $\Delta T_i = T_{i-1} - T_i = TU_{i-1} - TU_i$, then the acceleration can be approximated as follows:

$$\alpha = 4\pi/c \times (TL_i/T_i^3) \times [TU_i/TL_i - (TU_{i-1}/TL_{i-1})] \quad (6)$$

The term $4\pi/c$ is then cancelled from Equation (6) to obtain the following expression for acceleration which has units of (1/sec$^2$) and which is independent of the number of cylinders in the engine:

$$\text{Acceleration} = (TL_i/T_{i-1}^3) \times [TU_i/TL_i - (TU_{i-1}/TL_{i-1})] \quad (7)$$

which is the same as Equation (1).

It can be seen that this embodiment can accurately sense misfiring of a cylinder with high sensitivity using simple equipment.

In the routine of FIG. 15, the reference value used in step S12 to determine whether misfiring is taking place is a constant. However, it is possible for the reference value to be a variable value, such as an average of the acceleration over a prescribed number of crankshaft rotations. Alternatively, the reference value can be one which is selected from a memory map in accordance with the current operating conditions of the engine.

However, a misfiring sensing apparatus according to the present invention which detects misfiring based on the acceleration of a crankshaft is not limited to one using Equation (7), and any other suitable equation for calculating the acceleration can be employed. For example, although in the embodiment of FIG. 13 the calculated acceleration is defined so as to increase above a reference value when misfiring takes place, the acceleration can be defined so as to decrease below a reference value during misfiring.

What is claimed is:

1. A misfiring sensing apparatus for an engine equipped with a crankshaft and at least one cylinder having a piston connected to the crankshaft, comprising:
    period sensing means for sensing a length of a first period equal to a length of time for the crankshaft of the engine to rotate between first and second angular positions and for sensing a length of a different second period equal to a length of time for the crankshaft to rotate between third and fourth angular positions; and
    misfiring sensing means for sensing misfiring of the engine based on a ratio of the lengths of the first and second periods.

2. A misfiring sensing apparatus as claimed in claim 1 wherein the period sensing means comprises a crankshaft position sensor for sensing a rotational position of the crankshaft.

3. A misfiring sensing apparatus as claimed in claim 1 wherein the first and second periods are chosen so that the ratio is different when misfiring is taking place in the engine than when the engine is firing normally.

4. A misfiring sensing apparatus as claimed in claim 1 wherein at least a portion of the first period occurs during a compression stroke of a cylinder of the engine and at least a portion of the second period occurs during a combustion stroke a cylinder of the engine.

5. A misfiring sensing apparatus as claimed in claim 4 wherein the second angular position occurs no later than top dead center of a compression stroke of a cylinder of the engine.

6. A misfiring sensing apparatus as claimed in claim 4 wherein a piston of the engine is at top dead center of a compression stroke of the piston during the second period.

7. A misfiring sensing apparatus as claimed in claim 4 wherein the second angular position and the third angular position both correspond to the top dead center position of a piston of the engine during a compression stroke of the piston.

8. A misfiring sensing apparatus as claimed in claim 4 wherein the first period extends from A degrees before top dead center until B degrees before top dead center during a compression stroke of a cylinder of the engine, and the second period extends from B degrees before top dead center during the compression stroke of a cylinder of the engine until A degrees before top dead center during the compression stroke of the next cylinder in the firing order of the engine, wherein A and B are predetermined values.

9. A misfiring sensing apparatus as claimed in claim 1 wherein the misfiring sensing means comprises means for sensing misfiring by comparing the ratio with a reference value.

10. A misfiring sensing apparatus as claimed in claim 9 wherein the reference value is a constant.

11. A misfiring sensing apparatus as claimed in claim 9 further comprising reference selecting means for selecting the reference value based on an operating condition of the engine.

12. A misfiring sensing apparatus as claimed in claim 11 wherein the reference selecting means comprises means for selecting the reference value based on at least one of the engine load and the engine rotational speed.

13. A misfiring sensing apparatus as claimed in claim 11 wherein the reference selecting means comprises a memory containing the reference value as a function of an engine operating condition, and updating means for updating the memory based on the ratio of the lengths of the first and second periods.

14. A misfiring sensing apparatus as claimed in claim 1 wherein the misfiring sensing means comprises means for calculating an acceleration indicative of an angular acceleration of the crankshaft of the engine based on the ratio and sensing misfiring based on the calculated acceleration.

15. A misfiring sensing apparatus as claimed in claim 14 wherein the calculated acceleration is given by the formula:

$$\text{Acceleration} = (TL_i/T_{i\text{-}1}^3) \times [TU_i/TL_i - (TU_{i\text{-}1}/TL_{i\text{-}1})],$$

wherein:
    $TL_i$ is the length of the first period for a given cylinder,
    $TU_i$ is the length of the second period for the given cylinder,
    $TU_{i\text{-}1}$ is the length of the first period for the cylinder prior to the given cylinder in the firing order,
    $TL_{i\text{-}1}$ is the length of the second period for the cylinder prior to the given cylinder in the firing order, and
    $T_{i\text{-}1} = TL_{i\text{-}1} + TU_{i\text{-}1}$.

16. A misfiring sensing apparatus as claimed in claim 14 wherein the misfiring sensing means comprises means for sensing misfiring by comparing the calculated acceleration with a reference value.

17. A misfiring sensing apparatus for an engine equipped with a crankshaft comprising:
    acceleration determining means for calculating an instantaneous acceleration indicative of an angular acceleration of the crankshaft; and
    misfiring sensing means for sensing misfiring of the engine based on the calculated said instantaneous acceleration.

18. A misfiring sensing method comprising:
    sensing a length of a first period equal to a length of time for the crankshaft of the engine to rotate between first and second angular positions;
    sensing a length of a different second period equal to a length of time for the crankshaft to rotate between third and fourth angular positions;
    calculating a ratio of the lengths of the first and second periods; and
    sensing misfiring based on the ratio.

19. A method as claimed in claim 18 wherein the step of sensing misfiring comprises comparing the ratio with a reference value.

20. A method as claimed in claim 19 comprising sensing an operating condition of the engine and varying the reference value based on the operating condition.

21. A method as claimed in claim 20 wherein the operating condition comprises the engine load.

22. A method as claimed in claim 20 wherein the operating condition comprises the engine rotational speed.

23. A method as claimed in claim 20 comprising setting the reference value to a value based on the ratio.

* * * * *